No. 613,096. Patented Oct. 25, 1898.
J. B. VERNAY.
MACHINE FOR MANUFACTURING BOTTLES, &c.
(Application filed Dec. 28, 1897.)
(No Model.) 2 Sheets—Sheet 2.
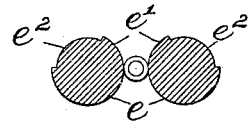
Fig. 3.
Fig. 5.
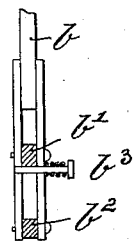
Fig. 7.
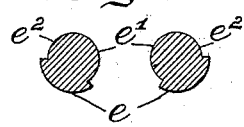
Fig. 4.
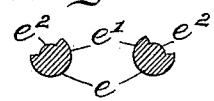
Fig. 6.
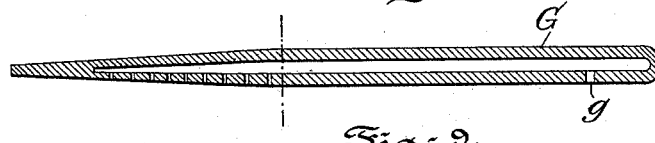
Fig. 8.
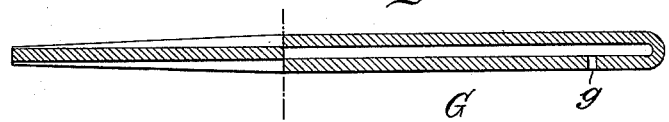
Fig. 9.
Fig. 10.
Fig. 11.
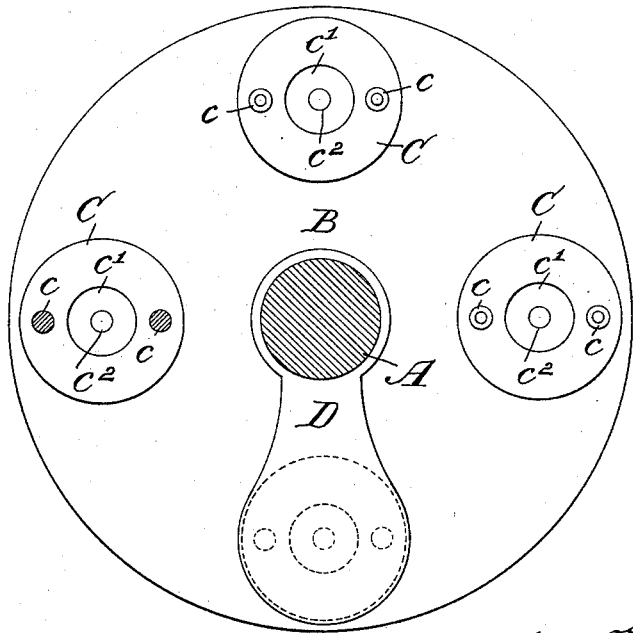
Fig. 2.
Witnesses:
Wilhelm Vogt
Thomas M. Smith.
Inventor:
Jean Baptiste Vernay,
By J. Walter Douglass,
Attorney.

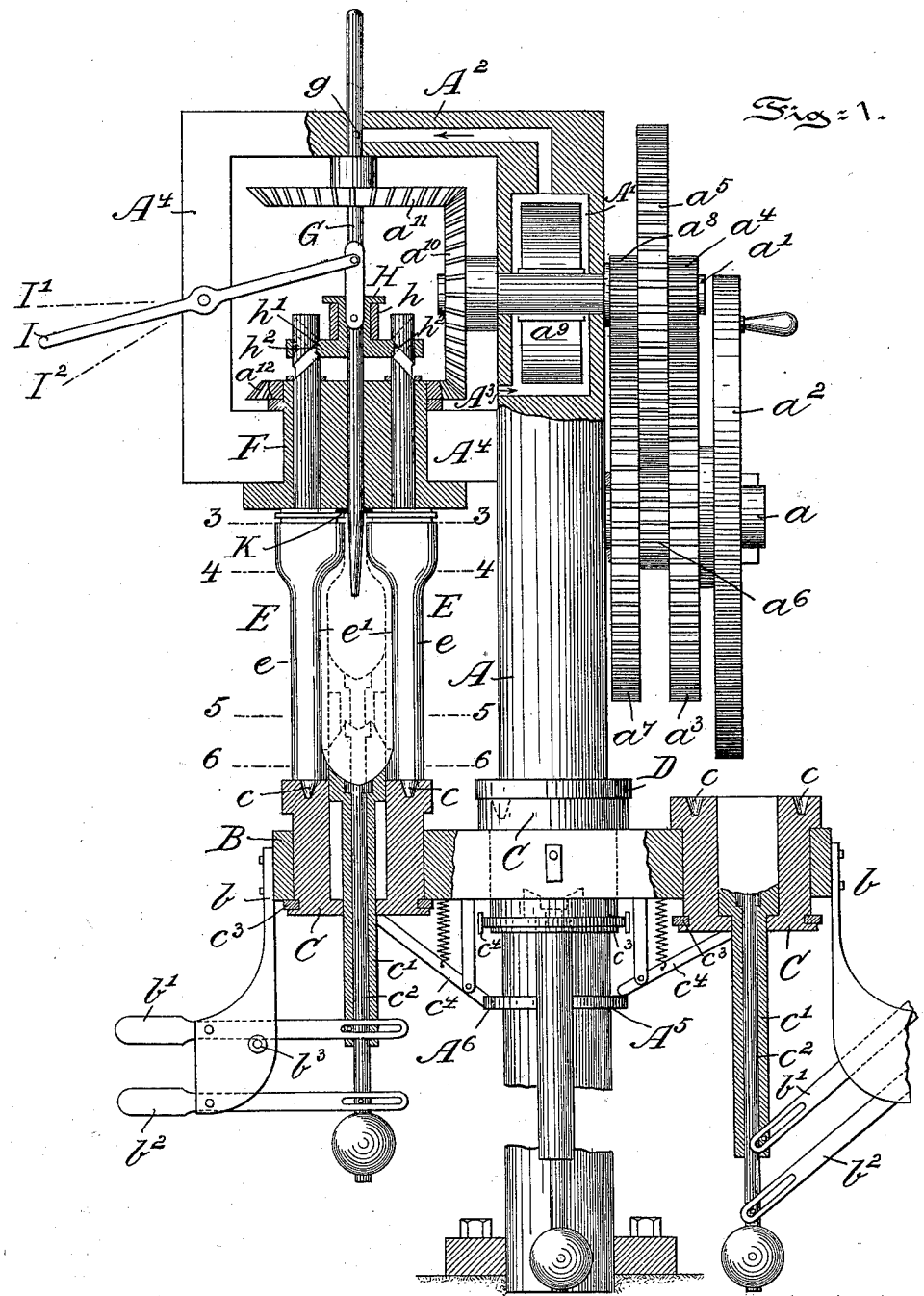

UNITED STATES PATENT OFFICE.

JEAN BAPTISTE VERNAY, OF PARIS, FRANCE.

MACHINE FOR MANUFACTURING BOTTLES, &c.

SPECIFICATION forming part of Letters Patent No. 613,096, dated October 25, 1898.

Application filed December 28, 1897. Serial No. 664,013. (No model.) Patented in France December 31, 1895, No. 252,894, and in England June 20, 1896, No. 13,676.

*To all whom it may concern:*

Be it known that I, JEAN BAPTISTE VERNAY, a citizen of the Republic of France, residing at Paris, France, have invented certain new and useful Improvements in Machines for Manufacturing Bottles and other Articles of Glass, (for which I have obtained French Letters Patent No. 252,894, dated December 31, 1895, and British Letters Patent No. 13,676, dated June 20, 1896,) of which the following is a specification.

My invention has relation to a machine for the manufacture of bottles and other articles of glass; and in such connection it relates particularly to the construction and arrangement of parts constituting such a machine.

The principal object of my invention is to provide a machine of comparatively simple construction wherein bottles and similar articles of glass may be shaped or formed somewhat in the manner as the formation of the articles formed of potters' clay—that is, the exterior of the article is formed by templets which revolve around the article in the manner of a throwing-wheel instead of being formed, as heretofore, by insertion in molds or dies.

My invention consists, primarily, of a machine comprising a suitable cup or receptacle for the molten glass and provided with means for elevating above said cup or receptacle the charge of glass, in combination with one or more templets of a shape corresponding to the external shape of the article when formed and with means for revolving the templet or templets about the external surface of the charge of glass when the same is elevated above the cup or receptacle.

My invention further consists of a machine for manufacturing bottles and other articles of glass constructed and arranged in substantially the manner hereinafter described and claimed.

The nature and scope of my invention will be more fully understood from the following description, taken in connection with the accompanying drawings, forming part hereof, in which—

Figure 1 is an elevation, partly in section, of the machine. Fig. 2 is a plan, certain parts being omitted or shown in section. Figs. 3, 4, 5, and 6 are sections on the lines 3 3, 4 4, 5 5, and 6 6 of Fig. 1. Fig. 7 is an end view of the levers shown in Fig. 1. Figs. 8 and 9 show in section, to an enlarged scale, two arrangements of the blowpipe shown in Fig. 1; and Figs. 10 and 11 are horizontal sections of the same.

Referring to the drawings, A is a fixed vertical axis.

A' is an opening formed in the axis A to receive a fan.

$A^2$ is an arm in which a passage is formed, as shown.

$A^3$ is an orifice for the entrance of air to the fan.

$A^4$ is a supporting-table fixed to the axis A and having a central hole.

$A^5$ is a ring fixed upon the axis A and provided with a notch $A^6$.

$a$ is a horizontal stud fixed upon the vertical axis A.

$a'$ is a horizontal axis rotating on the axis A.

$a^2$ is a fly-wheel.

$a^3$, $a^4$, $a^5$, $a^6$, $a^7$, and $a^8$ are gear-wheels.

$a^9$ is the fan.

$a^{10}$, $a^{11}$, and $a^{12}$ are bevel-wheels.

B is a horizontal disk traversed centrally by the axis A, around which it rotates.

$b\ b$ are supports fixed upon the side of the disk. In these supports the levers $b'$ and $b^2$ are mounted.

$b^3$ is a spring-pin serving as a stop for the lever $b'$.

The disk B is pierced with four holes for receiving the cups C. Each of these cups has on its upper face two conical holes $c\ c$. These cups are pierced at the bottom to give passage to two concentric rods $c'$ and $c^2$, attached, respectively, to the levers $b'$ and $b^2$. Each cup is counterweighted, so as to normally assume the position shown at the right of Fig. 1, in which it is supported by the upper face of the disk B.

$c^3$ is a ring on the cup, to which one end of a lever $c^4$ is pivoted. The other end of this lever rests freely upon the ring $A^5$. The lever $c^4$ is mounted in a suitable support situated below the disk B, and a spring tends to lift it.

D is a horizontal arm fixed to the axis A and above the disk B. The end of this arm is pierced with a hole, under which pass successively the four cups C.

E E are two absolutely similar templets, which turn about their axes. $e$ is the face for balling. $e'$ is the face for forming the bottle. $e^2$ is the face for releasing the bottle. These faces are shown in section in Figs. 3 to 6. These templets are mounted upon a sort of journal F, rotating in the table $A^4$. This journal F carries the bevel-wheel $a^{12}$ and is centrally pierced to give passage to the blowpipe G, having lateral holes $g$, upon which is mounted the bevel-wheel $a^{11}$, fixed upon the arm $A^2$. Around the pipe G is placed a socket H, surrounded by a ring $h$. Under this socket is fixed a cross-head $h'$, pierced with two holes to give passage to the axes of the templets E. This cross-head carries two projections $h^2$, which enter into helicoidal grooves formed around the axes of the templets E.

I is a lever which by means of two arms $i$, attached to the ring $h$, allows a to-and-fro motion to be given to the latter. I' and I² are the two other positions of this lever, and K is a bronze ring movable about the rod G.

The operation of the machine is as follows: The workman after having gathered glass, either with a gathering tube or ladle, pours it into the cup C, which is beneath the hole in the arm D. He then seizes the lever $b'$ of the cup C, into which the glass has been poured, and causes the disk B to make a quarter-turn in order to place the cup filled with glass underneath the templets E. The end of the lever $c^4$ resting upon the ring $A^5$ at this moment comes to the notch $A^6$, into which it falls by the effect of its spring. Its other end consequently lifts the cup C into the left-hand position of Fig. 1. As will be seen, the conical holes $c$ serve as bearings for the journals of the templets E. The fly $a^2$, to which the wheel $a^3$ is attached, is rotated. This wheel gears with the pinion $a^4$, which actuates the wheel $a^5$, to which it is fixed. The wheel $a^5$ rotates the pinion $a^6$, and consequently the wheel $a^7$, fixed to it. Lastly, the wheel $a^7$ drives the pinion $a^8$, fixed upon the axis $a'$. All the wheels and pinions except this latter are loose upon their axes and are in the ratio of one to five, which gives for every turn of the fly $a^2$ one hundred and twenty-five rotations of the axis $a'$, upon which the fan $a^9$ is mounted. Upon the axis $a'$ is fixed a bevel-wheel $a^{10}$, which actuates the two wheels $a^{11}$ and $a^{12}$ in different directions. The wheel $a^{11}$ carries with it the blowpipe G and the wheel $a^{12}$ the journal F, to which it is fixed, and consequently it communicates its motion to the two templets E, which carry with them the cup C. The balling-faces $e$ of these templets face inward at this moment. The workman presses upon the lever $b'$ for about a quarter of a minute and raises the rod $c'$, which carries with it the rod $c^2$, to its highest position. (Shown in dots in Fig. 1.) The glass is thus pushed into the upper part of the templets and against the bronze ring K. The blowpipe G is surrounded by the glass thus lifted and into which it enters. The circular movement of the templets forms the ring and the neck of the bottle and determines the shape of the ball. The workman then seizes the lever I, still keeping the lever $b'$ down, and brings it into the position shown in Fig. 1. The lever I, by means of its two arms $i$, lifts the ring $h$, and consequently the socket H, and its cross-head $h'$, the projections $h^2$ of which lie in the helicoidal grooves on the axes of the templets E, causing them to make a third of a turn, turning inward the bottle-shaping face $e'$ instead of the balling-face $e$. The socket H on rising carries with it the blowpipe G, the lateral opening $g$ of which coincides with the blowing-passage in the arm $A^2$. The air driven by the fan passes into the hollow rod G and passes out of its lower portion into the midst of the mass of glass, which it blows out, causing it to take the shape of a bottle. The workman slowly lifts the lever $b'$. The two rods $c'$ and $c^2$ are lowered, being carried downward by their weight, but care must be taken to maintain contact between these rods and the bottom of the bottle, which follows their movement by the effect of the blowing. The lever $b'$ is stopped by the pin $b^3$, which brings it to rest in the position shown at the left of Fig. 1. The blowing of the bottle is then complete. The lever I is then brought to its third position I². Blowing is thereby stopped, and the disengaging faces $e^2$ of the templets are turned inward. The workman seizes the lever $b^2$, which raises the rod $c^2$ into the intermediate position, (shown in dots in Fig. 1,) in order to form the indentation at the bottom of the bottle called the "kick." The bottle is then finished. To free it, the stop $b^3$ is withdrawn from the support $b$ and the lever lifted to bring the heads of the rods $c'$ and $c^2$ to the bottom of the cup C, and this latter is brought to its lowest position, as shown to the right of Fig. 1, the counterweight of said cup being sufficient to overcome the tension of spring of the lever $c^4$ and to thereby disengage said lever from the notch $A^6$. The fly is no longer rotated, and the bottle is lifted out. The machine is ready to recommence its operation with the following cup. Of course the details of the arrangements may be varied.

The mechanism, which has been shown as an example in order that the principle of the invention could be understood, may be modified in such a manner as to work automatically. I have shown two templets, but in certain cases it may be advisable to use three, four, or a greater number. There may also be but one templet. The templets may be made of any suitable material. Their shape varies according to circumstances. For example, the templets might only have a bottle-face and be drawn aside to allow of the movement of the bottle. One method of carrying these templets is shown, but any other suitable arrangement may be adopted, especially that which consists in leaving the templets fixed in the journal. The disk which carries four cups may be provided with a greater number, if required. Also it may be useful in certain cases to unite several templets and several cups in the same machine in order to make several articles at the same time. In place of the fan shown any other arrangement for blowing may be adopted. It will be easily understood that by modifying the shape of the templets I may obtain by rotation articles of all possible shapes. In certain cases it might be useful only to employ the templets for a part of the bottle, in order, for example, to make the ring and to combine them with a suitable mold to shape the body of the bottle.

To manufacture unblown articles of glass by rotation, it is only necessary to introduce a suitably-shaped mandrel between the templets, rotating it in the opposite direction to the latter, as is the case in the blowpipe G, which mandrel determines the inside shape of the articles.

Having thus described the nature and objects of my invention, what I claim as new, and desire to secure by Letters Patent, is—

1. In a machine of the character described, a cup or receptacle for a charge of glass, means for elevating said charge above the receptacle, one or more templets located above said receptacle, and means for causing said templet or templets to revolve around the exterior of the charge of glass to thereby form or shape the same, substantially as and for the purposes set forth.

2. In a machine of the character described, a table or disk adapted to be rotated, a series of cups or receptacles formed in said table or disk and adapted to receive a charge of glass, means for elevating said charge above the table, one or more templets located above the table and adapted to surround the charge of glass when the same is elevated, and means for revolving said templet or templets to form or shape the exterior of the charge of glass, substantially as and for the purposes set forth.

3. In a machine of the character described, a templet provided with two faces, of which one is adapted to shape the exterior of the article, while the other is adapted to permit of the release of said article when formed, means for rotating said templet upon its axis, and means for revolving said templet around the article, substantially as and for the purposes described.

4. In a machine of the character described, in combination with a perforated blowpipe and means for forcing air therethrough, of a cup or receptacle provided with a movable head or seat adapted to receive the charge of glass, means for elevating said head or seat until the charge of glass surrounds the blowpipe, one or more templets adapted to revolve around the charge of glass when elevated to shape the exterior of said charge, and means for revolving said templets, substantially as and for the purposes described.

5. In a machine of the character described, a cup or receptacle provided with a movable bottom or seat and adapted to receive the charge of glass, a bottom-forming head adapted to traverse the bottom or seat, means for elevating the bottom or seat and bottom-forming head conjointly, one or more templets adapted to revolve about the charge of glass when the bottom or seat and the head are elevated, means for revolving the templets, and means for further elevating the bottom-forming head independently of the bottom or seat, substantially as and for the purposes described.

In testimony whereof I affix my signature in presence of two witnesses.

JEAN BAPTISTE VERNAY.

Witnesses:
 C. DE MESTRAL,
 EDWARD P. MACLEAN.